(12) United States Patent
Fagrenius et al.

(10) Patent No.: US 7,810,511 B2
(45) Date of Patent: Oct. 12, 2010

(54) LENS CLEANER

(75) Inventors: Nils Gustav Fagrenius, Dalby (SE);
Sven Rune Fredrik Palmqvist,
Staffanstorp (SE); Johan Martin Wedel,
Furulund (SE); Carl Magnus Waldt,
Kävlinge (SE); Eva Tina Rålin, Malmö
(SE); Sten Ola Håkansson, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1185 days.

(21) Appl. No.: 11/433,572

(22) Filed: May 15, 2006

(65) Prior Publication Data
US 2007/0261711 A1 Nov. 15, 2007

(51) Int. Cl.
*B08B 3/00* (2006.01)
(52) U.S. Cl. ............................. 134/44; 134/52; 134/54; 396/419; 396/420; 396/422; 396/424
(58) Field of Classification Search .................. None
See application file for complete search history.

(56) References Cited

U.S. PATENT DOCUMENTS

| 2,583,228 A | 1/1952 | Numbers |
| 5,406,413 A | 4/1995 | Mogamiya |
| 6,793,416 B2 * | 9/2004 | Peterson et al. ............. 396/427 |
| 7,138,640 B1 * | 11/2006 | Delgado et al. ............. 250/372 |
| 2005/0128604 A1 | 6/2005 | Kuba |

FOREIGN PATENT DOCUMENTS

| JP | 2-310548 | 12/1990 |
| JP | 5-151601 | 6/1993 |

OTHER PUBLICATIONS

International Preliminary Report on Patentability with a mailing date of Aug. 7, 2008 issued for corresponding international application No. PCT/IB2006/054260; 9 pages.
International Search Report for corresponding PCT application with a mailing date of May 4, 2007; 4 pages.

* cited by examiner

*Primary Examiner*—Duy-Vu N Deo
(74) *Attorney, Agent, or Firm*—Harrity & Harrity, LLP

(57) ABSTRACT

A device may include a receiving surface to receive a cleaning device adapted to clean a surface of a lens when the device is proximate to the surface of the lens. The device may further include a mounting surface to moveably support the device on a host surface, where the host surface further supports a lens. The mounting surface may further maintain the device in a first position that maintains the cleaning device proximate to the surface of the lens to remove a foreign object from the surface of the lens, and maintain the device in a second position that maintains the cleaning device away from the surface of the lens to allow the lens to receive optical information related to a subject.

13 Claims, 8 Drawing Sheets

LENS CLEANER

BACKGROUND OF THE INVENTION

1. Technical Field of the Invention

Implementations described herein relate generally to lenses, and more particularly to cleaning camera lenses.

2. Description of Related Art

Devices, such as mobile communication devices, may perform functions other than communication functions to make these devices more useful to consumers. For example, mobile communication devices may be configured to store and play music and/or video files and/or to record still images or video.

A consumer may find mobile communication devices with image capturing capabilities to be very useful as the consumer does not have to carry a separate camera to record images. Optics used to record images, such as a digital camera lens, may become dirty as foreign objects (e.g., dust, dirt, pollen, skin oil, make-up, etc.) collect on a surface of the lens. A dirty lens may not record satisfactory images since the dirt may block or distort optical information entering through the lens.

Consumers that use mobile communication devices that include cameras and consumers that use dedicated cameras may benefit from techniques that reduce and/or eliminate problems caused by dirty camera lenses.

BRIEF SUMMARY OF THE INVENTION

According to one aspect, a device is provided. The device may include a receiving surface to receive a cleaning device adapted to clean a surface of a lens when the cleaning device is proximate to the surface of the lens. The device may further include a mounting surface to moveably support the device on a host surface, where the host surface further supports a lens. The mounting surface may further maintain the device in a first position that maintains the cleaning device proximate to the surface of the lens to remove a foreign object from the surface of the lens, and maintain the device in a second position that maintains the cleaning device away from the surface of the lens to allow the lens to receive optical information related to a subject.

Additionally, the cleaning device contacts the surface of the lens when the device is in the first position.

Additionally, the cleaning device removes the foreign object using an electrical charge, a fluid, a gas, or friction.

Additionally, the cleaning device is removeably supported on the receiving surface. Additionally, the cleaning device includes one or more lens tissues, lens cloths or lens brushes.

Additionally, the device slides from the first position to the second position, pivots from the first position to the second position, or rotates from the first position to the second position.

Additionally, the device is manually, mechanically, or electrically moved from the first position to the second position.

Additionally, the device operates with a mobile terminal that includes a lens or with a camera.

According to another aspect, a mobile terminal is provided. The mobile terminal may include a lens to receive optical information through an outer surface of the lens. The mobile terminal may further include a lens cleaner to remove a foreign object from the outer surface when the lens cleaner is proximate to the outer surface. The mobile terminal may further include a lens cover comprising an inner surface, the lens cover to support the lens cleaner on the inner surface to make the lens cleaner available to the outer surface and to move from a first position to a second position that locates the lens cleaner proximate to the outer surface to remove the foreign object from the outer surface.

Additionally, the mobile terminal may further comprise an actuator to move the lens cover from the first position to the second position.

Additionally, the lens cleaner may comprise a tissue, a cloth, a brush, a nozzle, a fluid, or an electrical conductor.

Additionally, the lens cover is removeably supported on the mobile terminal. In yet another aspect, the lens cover moves pivotally, laterally, or rotationally with respect to a surface of the mobile terminal.

Additionally, the lens cover moves in response to electrical, mechanical, or manual actuation.

According to still another aspect, a device is provided. The device may include means for receiving optical information; means for cleaning the receiving means when the cleaning means is proximate to a surface of the receiving means; means for supporting the cleaning means on a surface of the device, where the supporting means is moveable from a first position to a second position and where the second position is proximate to the surface of the receiving means; and means for removing the cleaning means from the supporting means.

According to yet another aspect, a method is provided. The method may comprise displacing a lens cover from a first position to a second position with respect to an upper surface of a lens; removing a foreign object from the upper surface when the lens cover is in the second position, where the foreign object is removed by a lens cleaner supported on the lens cover; and returning the lens cover to the first position to allow optical information to reach the lens.

Additionally, the method may further include receiving an input signal from a control key or a keypad key and recording an image in response to the input signal using the lens.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the invention.

Implementations of the invention can be used to improve the quality of images produced using digital or film based cameras. For example, an implementation may be used on a mobile terminal that includes a digital camera. In one implementation, a lens cover may include a lens cleaning device. The lens cleaning device may be configured so that the lens is cleaned when the lens cover is displaced over the lens or is displaced away (i.e., removed) from the lens. For example, the lens cover may be slideably supported on a surface of a host device, such as the mobile terminal, that includes the lens. The lens cleaning device may remove foreign objects from the lens when the lens cover is slid into a position covering the lens and/or when the lens cover is slid from a position covering the lens to a position that exposes the lens. Implementations of lens covers and lens cleaning techniques described herein may be used on dedicated still image or video cameras as well as being used on other types of devices that can include lenses.

Exemplary implementations of the invention will be described in the context of a mobile communications terminal. It should be understood that a mobile communication terminal is an example of one type of device that can employ lens cleaning techniques consistent with principles of the invention and should not be construed as limiting the types of devices, or applications, that can use implementations of lens cleaning described herein. For example, lens cleaning techniques described herein, may be used in non-wireless devices, such as film-based cameras, digital cameras, and/or other types of devices that can include camera-like functions to capture still or moving images.

Exemplary Mobile Terminal

Figure 1A:
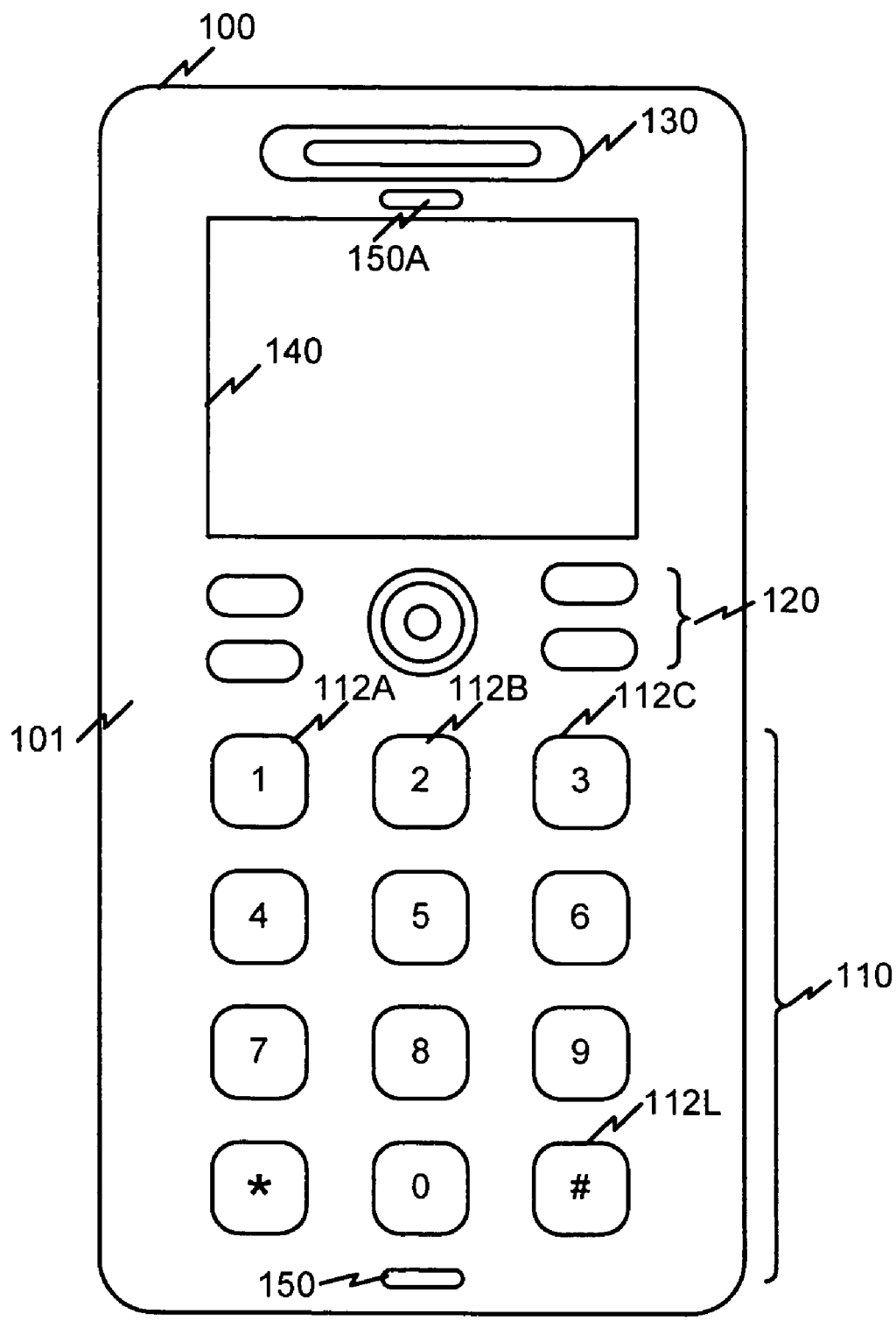
FIGS. 1A and 1B are diagrams of an exemplary implementation of a mobile terminal consistent with principles of the invention.

FIG. 1A is a diagram of an exemplary implementation of a mobile terminal 100 consistent with the principles of the invention. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and data communications capabilities; a PDA that can include a radiotelephone, pager, Internet/intranet access, web browser, organizer, calendar, and/or global positioning system (GPS) receiver; and a laptop and/or palmtop receiver or other appliance that includes a radiotelephone transceiver.

Terminal 100 may include housing 101, keypad 110, control keys 120, speaker 130, display 140, and microphones 150 and 150A. Housing 101 may include a structure configured to hold devices and components used in terminal 100. For example, housing 101 may be formed from plastic, metal, or another material and may be configured to support keys 112A-L (collectively keys 112), control keys 120, speaker 130, display 140 and microphone 150 or 150A. In one implementation, housing 101 may form a front surface, or face of terminal 100.

Keypad 110 may include devices, such as keys 112A-L, that can be used to enter information into terminal 100. Keys 112 may be used in a keypad (as shown in FIG. 1A), in a keyboard, or in some other arrangement of keys. Implementations of keys 112 may have key information associated therewith, such as numbers, letters, symbols, etc. A user may interact with keys 112 to input key information into terminal 100. For example, a user may operate keys 112 to enter digits, commands, and/or text, into terminal 100.

Control keys 120 may include buttons that permit a user to interact with terminal 100 to cause terminal 100 to perform an action, such as to take a digital photograph using a digital camera embedded in terminal 100, display a text message via display 140, raise or lower a volume setting for speaker 130, etc. Speaker 130 may include a device that provides audible information to a user of terminal 100. Speaker 130 may be located in an upper portion of terminal 100 and may function as an ear piece or with an ear piece when a user is engaged in a communication session using terminal 100.

Display 140 may include a device that provides visual information to a user. For example, display 140 may provide information regarding incoming or outgoing calls, text messages, games, images, video, phone books, the current date/time, volume settings, etc., to a user of terminal 100. In one implementation, display 140 may display still images or video images that are received via a lens.

Microphones 150 and/or 150A may, respectively, include a device that converts speech or other acoustic signals into electrical signals for use by terminal 100. Microphone 150 may be located proximate to a lower side of terminal 100 and may convert spoken words or phrases into electrical signals for use by terminal 100. Microphone 150A may be located proximate to speaker 130 and may receive acoustic signals proximate to a user's ear while the user is engaged in a communications session using terminal 100. For example, microphone 150A may receive background noise and/or sound coming from speaker 130.

Figure 1B:
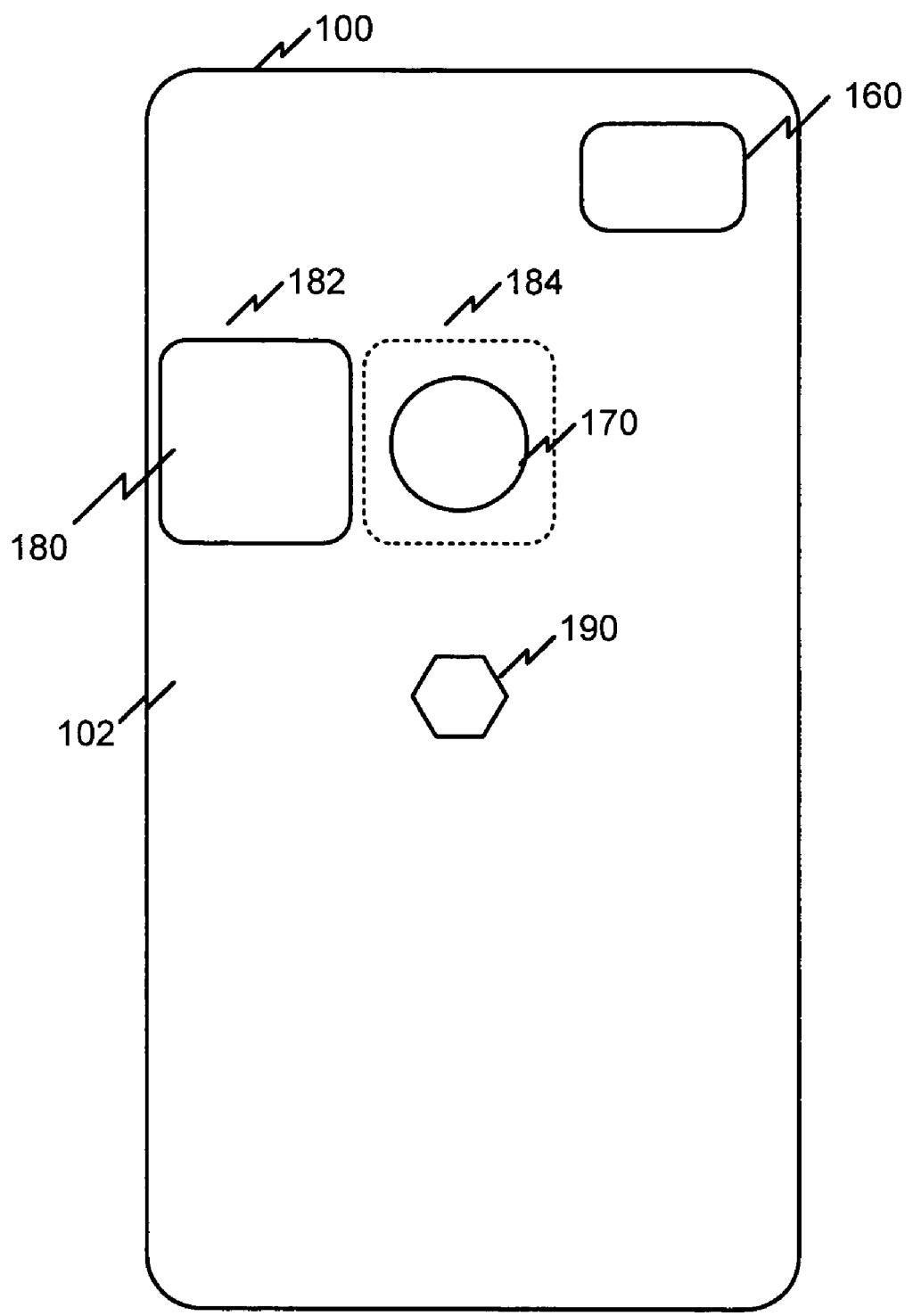

FIG. 1B illustrates a back surface 102 of terminal 100. Back surface 102 may include a flash 160, a lens 170, a lens cover 180, and a range finder 190. Back surface 102 may be made of plastic, metal, and/or another material and may be configured to support flash 160, lens 170, lens cover 180, and range finder 190.

Flash 160 may include a device to illuminate a subject that is being photographed with lens 170. Flash 160 may include light emitting diodes (LEDs) and/or other types of illumination devices. Lens 170 may include a device to receive optical information related to an image. For example, lens 170 may receive optical reflections from a subject and may capture a digital representation of the subject using the reflections. Lens 170 may include optical elements, mechanical elements, and/or electrical elements. An implementation of lens 170 may have an upper surface that faces a subject being photographed and a lower surface that faces an interior portion of terminal 100, such as a portion of terminal 100 housing electronic components.

Lens cover 180 may include a device to protect and/or clean lens 170 when lens 170 is not in use. In one implementation, lens cover 180 may be slideably attached to back surface 102 so that lens cover 180 can be displaced over lens 170 (position 184 in FIG. 1B) or displaced to uncover lens 170 (position 182 in FIG. 1B). In another implementation, lens cover 180 may be pivotally mounted to back surface 102 (e.g., via hinges) in a manner whereby lens cover 180 can cover and/or uncover lens 170. In still another implementation, lens cover 180 may be rotationally mounted to back surface 102 (e.g., via a pin-type connection). Lens cover 180 may be displaced via an actuator (e.g., an electrical and/or mechanical actuator) and/or manually (e.g., via an operator) to cover and/or uncover lens 170. Implementations of lens cover 180 may be fabricated from a substantially rigid material, such as plastic, metal, composite, etc.

Range finder 190 may include a device to determine a range from lens 170 to a subject (e.g., a subject being photographed with terminal 100). Range finder 190 may be connected to an auto-focus element in lens 170 to bring a subject into focus with respect to lens 170. Range finder 190 may operate using ultrasonic signals, infrared signals, etc. consistent with the principles of the invention.

Exemplary Functional Diagram

Figure 2:
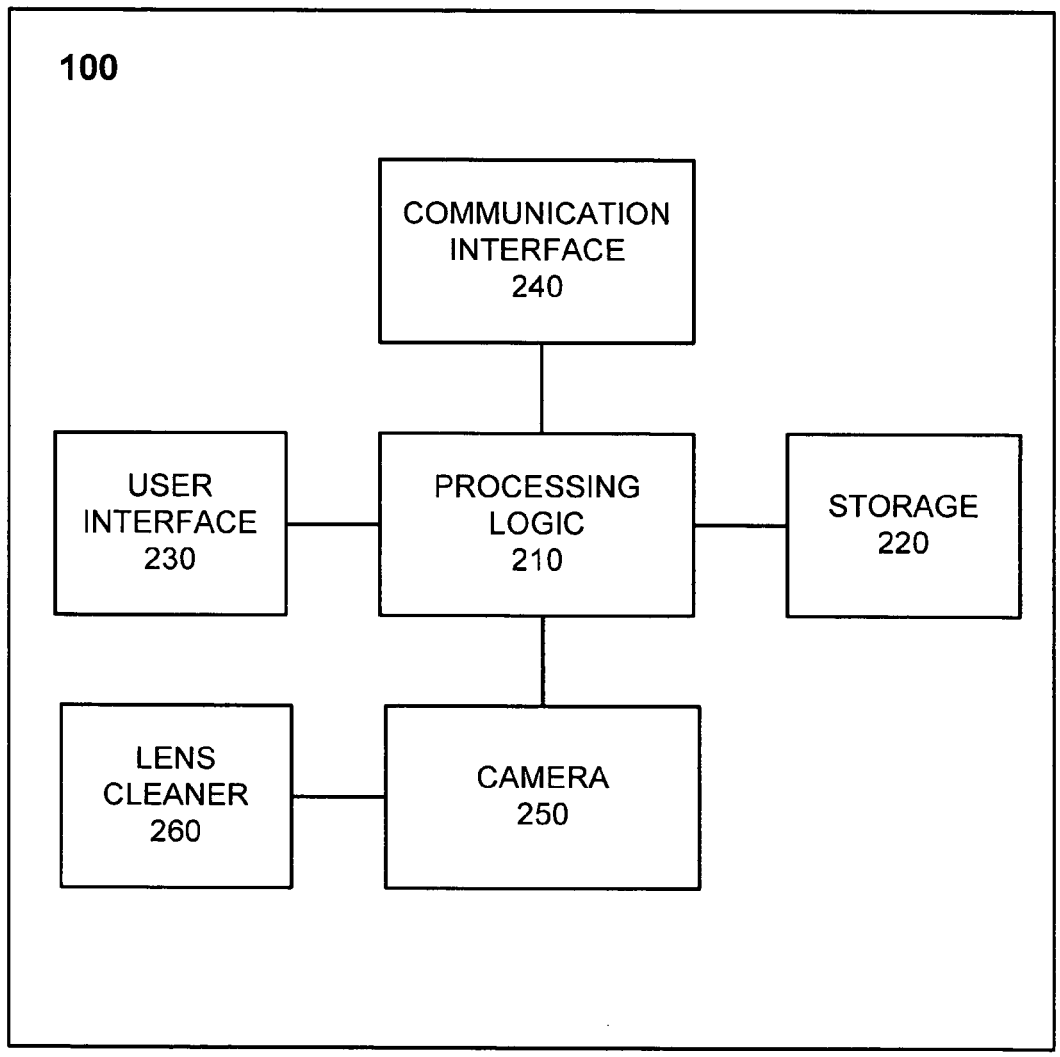
FIG. 2 illustrates an exemplary functional diagram of a mobile terminal consistent with principles of the invention.

FIG. 2 illustrates an exemplary functional diagram of mobile terminal 100 consistent with principles of the invention. As shown in FIG. 2, terminal 100 may include processing logic 210, storage 220, a user interface 230, a communication interface 240, a camera 250 and a lens cleaner 260. Processing logic 210 may include a processor, microprocessor, an application specific integrated circuit (ASIC), field programmable gate array (FPGA), or the like. Processing logic 210 may include data structures or software programs to control operation of terminal 100 and its components, such as camera 250. Storage 220 may include a random access memory (RAM), a read only memory (ROM), a magnetic or optical disk and its corresponding drive and/or another type of memory to store data and instructions that may be used by processing logic 210.

User interface 230 may include mechanisms for inputting information to terminal 100 and/or for outputting information from terminal 100. Examples of input and output mechanisms might include a speaker (e.g., speaker 130) to receive electrical signals and output audio signals, a microphone (e.g., microphone 150 or 150A) to receive audio signals and output electrical signals, buttons (e.g., control keys 120 and/or keys 112) to permit data and control commands to be input into terminal 100, a display (e.g., display 140) to output visual information, and/or a vibrator to cause terminal 100 to vibrate.

Communication interface 240 may include, for example, an antenna, a transmitter that may convert baseband signals from processing logic 210 to radio frequency (RF) signals and/or a receiver that may convert RF signals from the antenna to baseband signals. Alternatively, communication interface 240 may include a transceiver that performs the functions of both a transmitter and a receiver.

Camera 250 may include hardware and software based logic to create still or moving images using terminal 100. In one implementation, camera 250 may include solid-state image capturing components, such as charge coupled devices (CCDs). In other implementations, camera may include non-solid state devices, such as devices used to record images onto film. Implementations of camera 250 may operate with an object detection device that determines when foreign objects are on an upper surface of lens 170. For example, the object detection device may use image processing techniques, such as evaluating light reflections with respect to lens 170, light transmittance through lens 170, and/or shadows on a surface of lens 170, to determine when foreign objects are located on a surface of lens 170. Camera 250 may communicate an object detection result to lens cleaner 260.

Lens cleaner 260 may include devices to remove foreign objects, such as dirt and/or debris, from a surface of lens 170. In one implementation, lens cleaner 260 may be integrated into lens cover 180. Lens cleaner 260 may use mechanical, pneumatic, fluid-based, and/or electrical cleaning techniques to remove dirt and/or debris from a surface of lens 170. Implementations of lens cleaner 260 may receive an instruction, such as an instruction related to a result determined by an object detection device, and may clean a surface of lens 170 in response to the instruction. Implementations of lens cleaner 260 may be implemented to clean a surface of lens 170 whenever a lens cleaning device passes over lens 170 and/or to clean a surface of lens 170 only when a foreign object is present thereon.

As will be described in detail below, terminal 100, consistent with principles of the invention, may perform certain operations relating to removing objects (e.g., dust) from a surface of lens 170. Terminal 100 may perform these operations in response to processing logic 210 executing software instructions of a lens cover/lens cleaner displacement application contained in a computer-readable medium, such as storage 220. A computer-readable medium may be defined as a physical or logical memory device and/or carrier wave.

The software instructions may be read into storage 220 from another computer-readable medium or from another device via communication interface 240. The software instructions contained in storage 220 may cause processing logic 210 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Exemplary Sliding Implementation

Figure 3A:
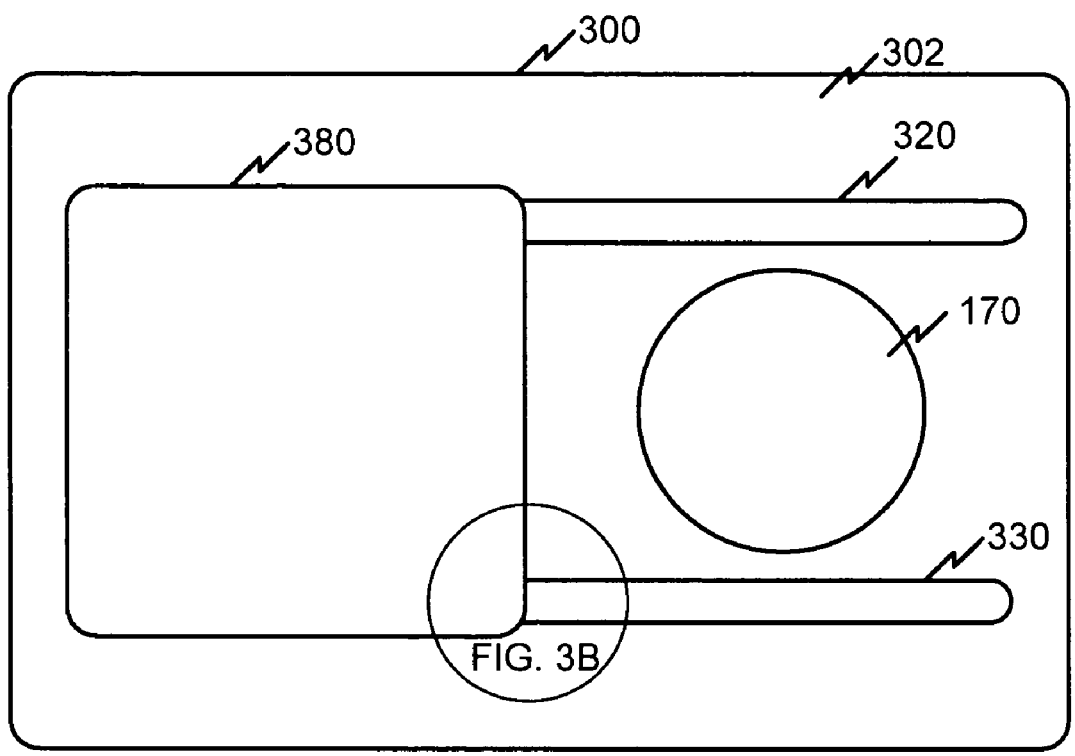
FIG. 3A illustrates an exemplary implementation of a mobile terminal that includes a lens cover consistent with principles of the invention.

FIG. 3A illustrates an exemplary implementation of a mobile terminal that includes a lens cover consistent with principles of the invention. In the implementation of FIG. 3A, terminal 300 may include lens 170, back surface 302, upper guide 320, lower guide 330, and lens cover 380. Lens 170 may operate as described in connection with FIG. 1B. Back surface 302 may operate as a host surface and may support lens 170, upper guide 320, lower guide 330, and lens cover 380. Guides 320 and 330 may include channels recessed into back surface 302 that allow one or more support members 340 (FIG. 3B) to slide from a first position that leaves lens 170 uncovered to a second position that leaves lens 170 covered.

Lens cover 380 may be configured in a manner similar to lens cover 180. Lens cover 380 may operate as a receiving device to receive a lens cleaning device. For example, lens cover 380 may be configured to removeably support a lens cleaning device on a lower surface thereof (i.e., a surface that faces an upper surface of lens 170). The lens cleaning device may be arranged to contact a surface of lens 170 when lens cover 380 is in a certain position (e.g., a closed position where lens cover 380 is covering lens 170).

Figure 3B:
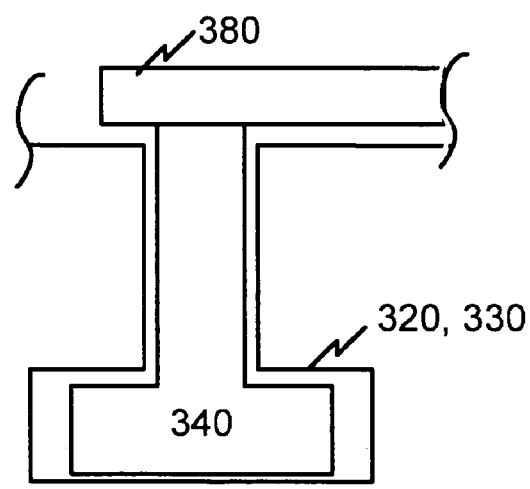
FIG. 3B illustrates a diagram of an exemplary channel used in the implementation of FIG. 3A consistent with principles of the invention.

FIG. 3B illustrates a diagram of an exemplary guide 320 or 330 used in the implementation of FIG. 3A. Guide 320/330 may be recessed into back surface 302 and may receive supporting member 340. Supporting member 340 may be shaped to engage guide 320/330 in a manner that allows supporting member 340 to slide along guide 320/330 without becoming disengaged from guide 320/330. Supporting member 340 may be configured so that a lower end of supporting member 340 engages guide 320/330 and an upper end of supporting member 340 engages a surface of lens cover 380, such as a lower surface of lens cover 380.

Exemplary Lens Cover

Figure 4:
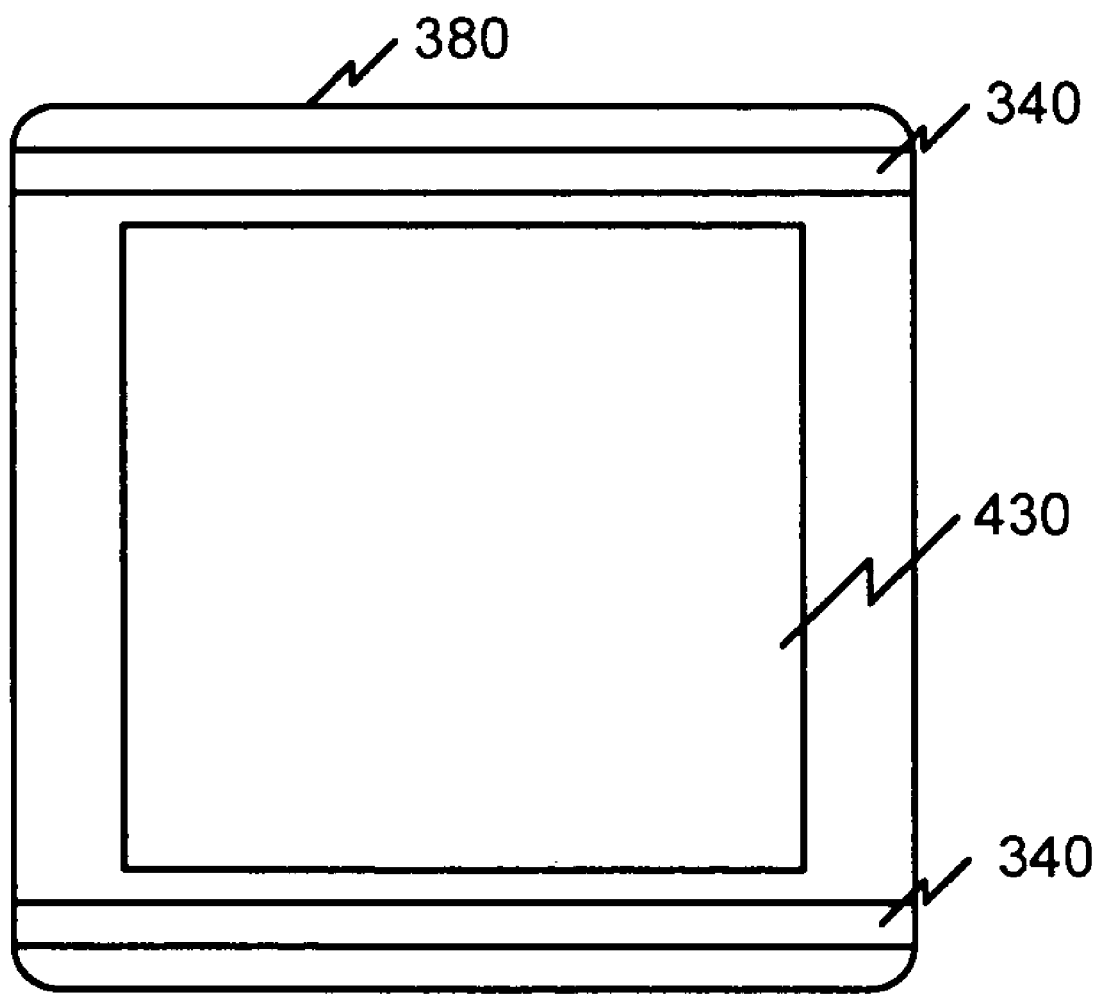
FIG. 4 illustrates a block diagram of an exemplary implementation of a lens cover that includes a lens cleaner consistent with principles of the invention.

FIG. 4 illustrates an exemplary implementation of lens cover 380 that includes a lens cleaner consistent with principles of the invention. The implementation of FIG. 4 may include lens cover 380, supporting members 340, and lens cleaner 430. Lens cleaner 430 may include a device to remove foreign objects, such as dust, dirt, and/or debris, from an upper surface of lens 170. In one implementation, lens cleaner 430 may include a mechanical device such as a lens tissue, lens cloth, or lens brush that is removeably affixed to an inner surface of lens cover 380. A mechanical implementation of lens cleaner 430 may remove foreign objects from a surface of lens 170 using friction and/or adhesion. In another implementation, lens cleaner 430 may include a fluid and/or mechanical-based device, such as a fluid reservoir for depositing lens cleaning fluid onto an upper surface of lens 170 and a mechanical lens wiper (e.g., a compliant rubber wiper) to remove the fluid and/or foreign objects from a surface of lens 170. In still other implementations, lens cleaner 430 may include electrical and/or pneumatic (e.g., gas-based) lens cleaning devices. Implementations of lens cleaner 430 may be configured to remove foreign objects from a surface of lens 170 when lens cleaner 430 and/or lens cover 380 are proximate to the surface of lens 170.

Exemplary Pneumatic Lens Cleaning Implementation

Figure 5:
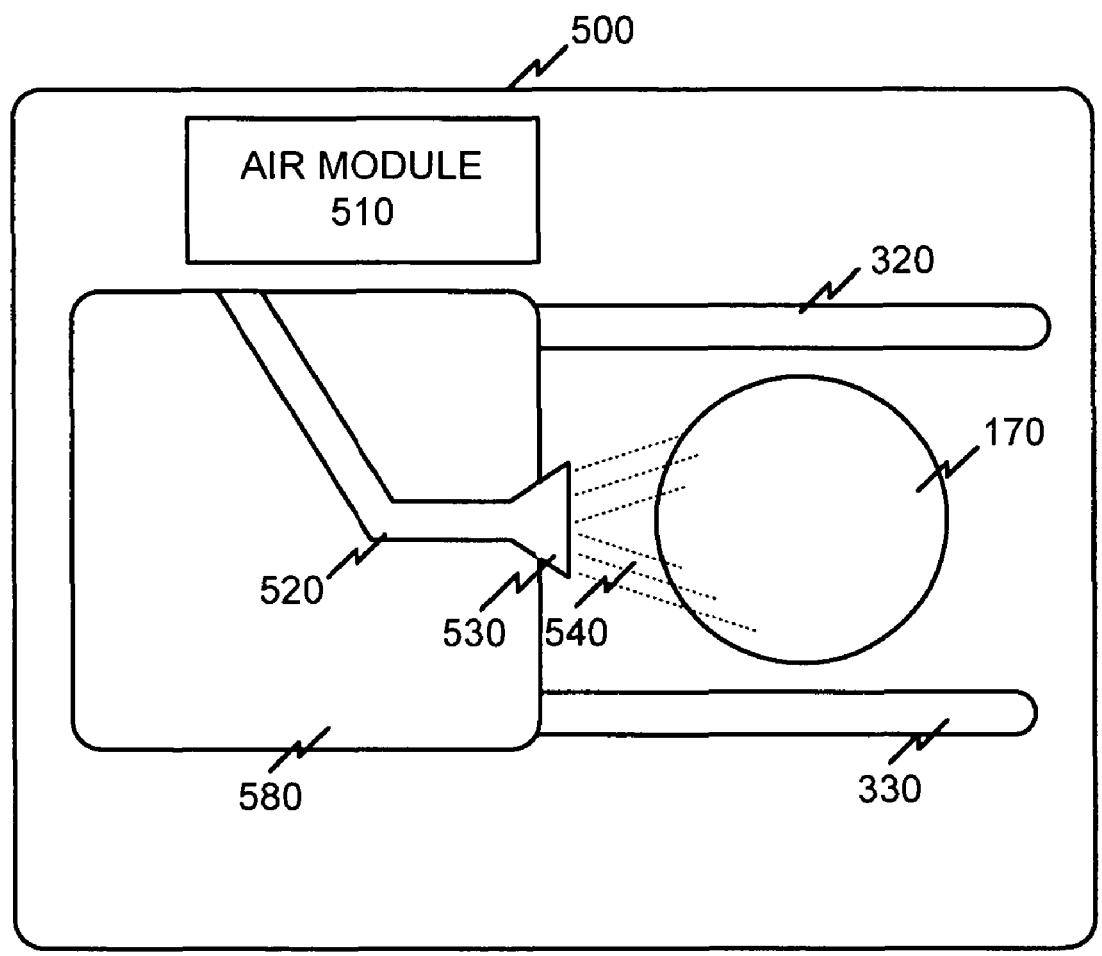
FIG. 5 illustrates an exemplary diagram of a mobile terminal that includes a lens cover utilizing a nozzle consistent with principles of the invention.

FIG. 5 illustrates an exemplary diagram of a mobile terminal that includes a lens cover utilizing a nozzle consistent with principles of the invention. In the implementation of FIG. 5, terminal 500 may include lens 170, upper guide 320, lower guide 330, air module 510, air duct 520, nozzle 530, air stream 540, and lens cover 580. Lens 170, upper guide 320, and lower guide 330 may operate as previously described. Air module 510 may include a device to produce a positive or negative air pressure in air duct 520. For example, air module 510 may include a diaphragm, pump, vacuum device, etc. to produce a positive pressure to blow foreign objects off an upper surface of lens 170 and/or a negative pressure to suck foreign objects off of an upper surface of lens 170. Implementations of air module 510 may be electrically, electro-mechanically, and/or mechanically operated.

Air duct 520 may include a structure to direct a volume of air from one location to another. Air duct 520 may act as an air guide and may be fabricated from plastic, composite, etc. Nozzle 530 may include a device to direct the air volume at a location as an air stream 540, such as an upper surface of lens 170. Nozzle 530 may be adapted to produce a determined air velocity on a surface of lens 170 to dislodge foreign objects from the surface of lens 170.

Lens cover 580 may include a device to cover and/or uncover lens 170. Lens cover 580 may include air duct 520 and/or nozzle 530. In one implementation, air module 510 and lens cover 580 may operate so that air stream 540 is produced when lens cover 580 is moved toward lens 170. Lens cover 580 may operate to remove foreign objects from an upper surface of lens 170 before lens cover 580 covers lens 170. In one implementation, air duct 520 and nozzle 530 may be supported on a lower surface of lens cover 580 proximate to an upper surface of lens 170. When lens cover 580 is moved toward lens 170, air module 510 may supply a volume of air to nozzle 530. Nozzle 530 may direct the air volume at the upper surface of lens 170 at a determined velocity so as to remove foreign objects from the upper surface of lens 170.

Exemplary Electrical Lens Cleaning Implementation

Figure 6:
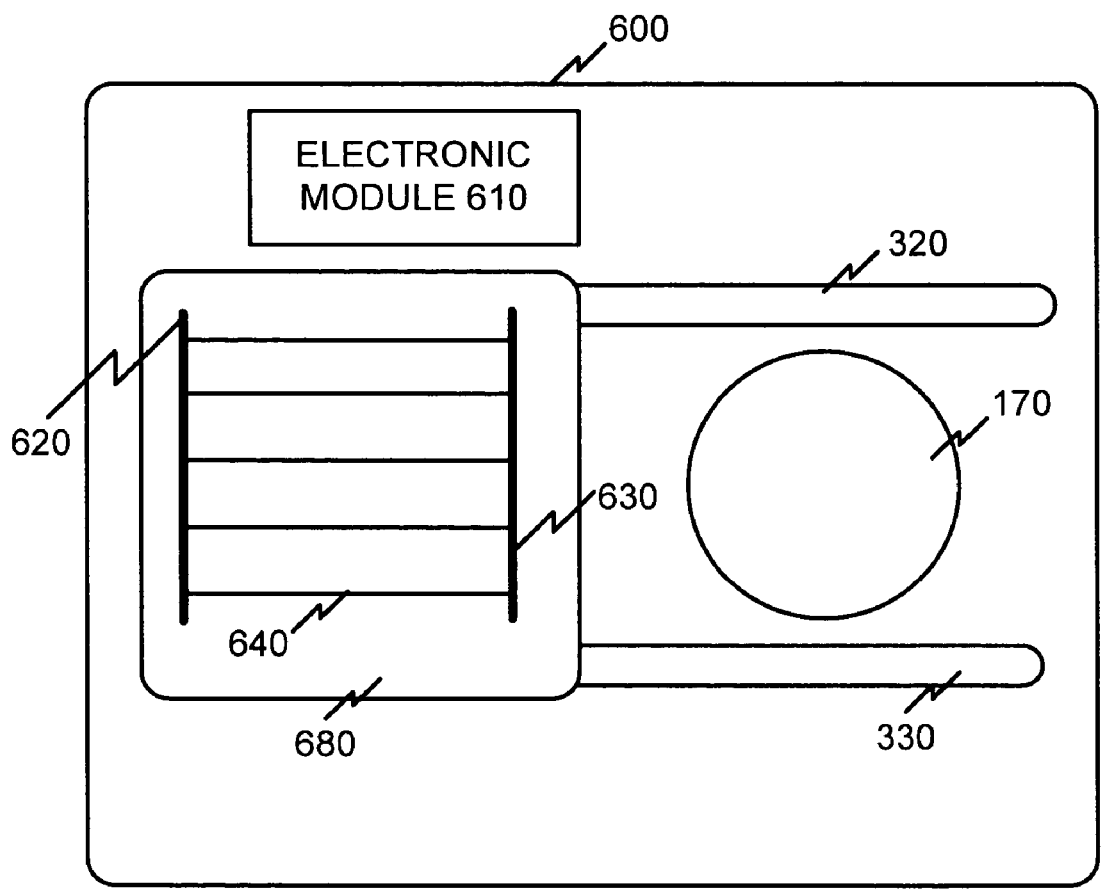
FIG. 6 illustrates an exemplary implementation of a mobile terminal that includes a lens cover utilizing an electrical lens cleaning technique consistent with principles of the invention.

FIG. 6 illustrates an exemplary implementation of a mobile terminal that includes a lens cover utilizing an electrical lens cleaning technique consistent with principles of the invention. In the implementation of FIG. 6, terminal 600 may include lens 170, upper guide 320, lower guide 330, electronic module 610, positive supply rail 620, negative supply rail 630, cross-wire 640, and lens cover 680. The implementation of FIG. 6, may be adapted to create a potential, such as a static potential, on a lower surface of lens cover 680 proximate to an upper surface of lens 170. The potential may cause foreign objects to transfer from the upper surface of lens 170 to the lower surface of lens cover 680, thereby removing the foreign objects from a surface of lens 170.

Electronic module 610 may include a device to supply a voltage and/or current to positive supply rail 620 and/or negative supply rail 630. Electronic module 610 may be powered via a battery and may supply a potential to positive and negative supply rails 620/630 when lens cover 680 is displaced toward lens 170 and/or when lens cover 680 is positioned over lens 170.

Positive supply rail 620 and negative supply rail 630 may include devices or structures to conduct a voltage or current to cross-wires 640. Implementations of positive supply rail 620 and negative supply rail 630 may be fabricated from electrically conductive material, such as metal, and/or materials that build up electrical potentials when power is applied thereto via electronic module 610.

Cross-wire 640 may include a device or structure to conduct an electrical signal. Implementations of cross-wire 640 may be made of metal and/or other materials that pass an electrical signal and/or that respond to an electrical signal. For example, implementations of cross-wires 640 may include materials that build up electrical potentials in response to electrical signals.

Lens cover 680 may include a structure to support positive supply rail 620, negative supply rail 630 and/or one or more cross-wires 640 proximate to an upper surface of lens 170. Lens cover 680 may be slideably, pivotally, rotationally, and/or removeably supported on a surface of terminal 600.

Exemplary Lens Cleaning Process

Figure 7:
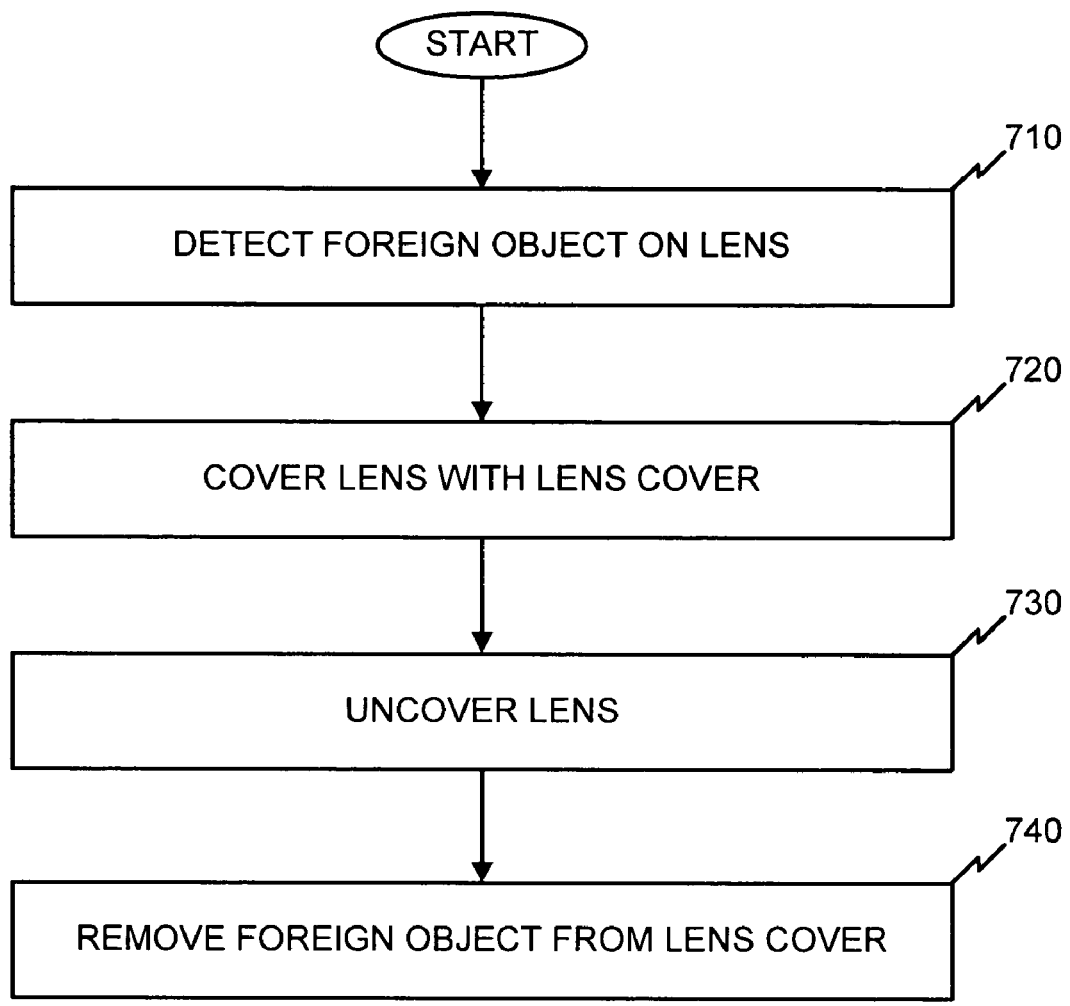
FIG. 7 illustrates an exemplary process that can be used to clean a lens consistent with principles of the invention.

FIG. 7 illustrates an exemplary process that can be used to clean lens 170 consistent with principles of the invention. The exemplary process may begin with the detection of one or more foreign objects on lens 170 (block 710). Implementations may detect foreign objects on lens 170 automatically (e.g., via an object detection device) and/or manually (e.g., via an operator of terminal 100). Implementations may clean a surface of lens 170 when objects are detected thereon or whenever lens cover 180, 380, 580, 680 (collectively "the lens cover") is positioned over a surface of lens 170. Block 710 may be omitted in implementations that do not detect the presence of a foreign object on a surface of lens 170.

The lens cover may be used to cover lens 170 (block 720). The lens cover may be slideably or pivotally supported on a surface of terminal 100, 300, 500, 600 (collectively "the terminal"). The lens cover may be slid from a first position that leaves an upper surface of lens 170 exposed (e.g., to take a photograph) into a second position that covers lens 170 (e.g., to protect lens 170 when not in use). The lens cover may remove foreign objects when foreign objects are detected on a surface of lens 170 and/or when foreign objects are on a surface of lens 170 whether or not the foreign objects have been detected.

For example, lens cover 380 may be configured with a lens cleaner 430 that includes one or more layers of lens tissue and/or lens cloth. Lens cover 380 may be adapted to remove foreign objects from an upper surface of lens 170 whenever lens cover 380 moves over the upper surface of lens 170. Lens cleaner 430 may physically contact an upper surface of lens 170 and may cause foreign objects to become attached to or embedded in lens cleaner 430 when lens cleaner 430 is moved across the upper surface of lens 170. Implementations of lens cleaner 430 may operate dry and/or moistened (e.g., with a lens cleaning solution).

Lens cover 580 or 680 may operate with a foreign object detection device and may remove foreign objects from an upper surface of lens 170 when the presence of one or more foreign objects is detected by the foreign object detection device. For example, air module 510 may receive an instruction to deliver a volume of air to air duct 520 and nozzle 530 when a foreign object is detected on an upper surface of lens 170. Lens cover 580 may be moved toward lens 170 and air stream 540 may be expelled via nozzle 530 at a determined velocity, where the determined velocity is adapted to remove foreign objects from the upper surface of lens 170. Foreign objects may be dislodged from the upper surface of lens 170 via air stream 540.

Lens cover 680 may be adapted to apply a potential to positive supply rail 620 and negative supply rail 630 when a foreign object is detected on an upper surface of lens 170. For example, electronic module 610 may receive an instruction from a foreign object detection device that a foreign object is on the upper surface of lens 170. Electronic module 610 may apply a potential to positive supply rail 620 and negative supply rail 630 when lens cover 680 is moved toward lens 170 and/or when lens cover 680 is positioned over lens 170. The applied potential may be adapted to produce a charge across one or more cross-wires 640. The charge may be adapted to attract foreign objects that are on the upper surface of lens 170 to the one or more cross-wires 640.

The upper surface of lens 170 may be uncovered (block 730). For example, lens cover 380 may be moved away from lens 170 so that lens 170 is exposed and may be used to capture an image. Lens cover 580 and/or 680 may likewise be moved away from lens 170 thereby exposing lens 170 for use in capturing images.

Foreign objects may be removed from the lens cover as needed (block 740). For example lens cover 380 may need to be cleaned whenever lens cleaner 430 passes over lens 170. In other implementations, lens cover 380 may be cleaned periodically, such as when lens cleaner 380 has reached a capacity limit with respect to foreign objects removed from lens 170. Implementations of lens cover 380 may be removed from terminal 300 to expose an under side (e.g., lower surface) of lens cover 380 that supports lens cleaner 430. A user of terminal 300 may remove a top layer of lens cleaner 430 (e.g., by removing the topmost layer of lens tissue or lens cloth) to remove foreign objects attached thereto and to expose a clean layer (e.g., a layer immediately below the removed layer) for use in subsequently removing foreign objects from an upper surface of lens 170. Alternatively, the user may clean the topmost layer of lens cleaner 430 (e.g., by rinsing or vacuuming lens cleaner 430) to remove foreign objects attached thereto.

Electronic module 610 may be adapted to apply a reverse potential, as compared to the potential used to attract foreign objects to cross-wires 640, when lens cover 680 is not covering lens 170. The reversed potential may cause foreign objects to be displaced away from cross-wires 640 thereby cleaning cross-wires 640 and/or lens cover 680. The clean cross-wires 640 may be used to remove foreign objects from an upper surface of lens 170 at a later time.

CONCLUSION

Implementations consistent with principles of the invention may facilitate removing foreign objects from surfaces, such as a surface of a lens. Implementations may employ mechanical, electrical, pneumatic, and/or fluid-based techniques to remove foreign objects from a surface. Other implementations may employ a combination of techniques to remove foreign objects consistent with principles of the invention.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

While a series of acts has been described with regard to FIG. 7, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit, a field programmable gate array, a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device, comprising:
   a lens cleaner to clean a surface of a lens when the lens cleaner is located at a first position proximate to the surface of the lens;
   an object detector to detect whether a foreign object is present on the surface of the lens; and
   a guide to:
   moveably support the lens cleaner on a host surface that supports the lens,
   maintain the lens cleaner at the first position proximate to the surface of the lens when the object detector detects the foreign object on the surface of the lens, and
   maintain the lens cleaner at a second position away from the surface of the lens to allow the lens to receive optical information related to a subject when the object detector does not detect the foreign object on the surface of the lens.

2. The device of claim 1, where the lens cleaner contacts the surface of the lens when the lens cleaner is in the first position.

3. The device of claim 1 where the lens cleaner removes the foreign object using an electrical charge, a fluid, a gas, or friction.

4. The device of claim 1, where the lens cleaner is removeably supported on the host surface.

5. The device of claim 1, where the lens cleaner includes one or more lens tissues, lens cloths or lens brushes.

6. The device of claim 1, where the lens cleaner slides from the first position to the second position, pivots from the first position to the second position, or rotates from the first position to the second position.

7. The device of claim 1, where the lens cleaner is automatically moved from the first position to the second position.

8. The device of claim 1, where the device is a mobile communication terminal or a camera.

9. A mobile terminal, comprising:
   a lens to:
      receive optical information through an outer surface of the lens;
   an object detector to:
      detect whether a foreign object is present on the outer surface of the lens;
   a lens cleaner to:
      remove the foreign object from the outer surface when the lens cleaner is proximate to the outer surface; and
   a lens cover comprising an inner surface, the lens cover to:
      support the lens cleaner on the inner surface to make the lens cleaner available to the outer surface, and
      move from a first position to a second position that locates the lens cleaner proximate to the outer surface to remove the foreign object from the outer surface when the object detector detects the foreign object on the outer surface of the lens.

10. The mobile terminal of claim 9, further comprising:
   an actuator to move the lens cover from the first position to the second position.

11. The mobile terminal of claim 9, where the lens cleaner comprises:
   a tissue, a cloth, a brush, a nozzle, a fluid, or an electrical conductor.

12. The mobile terminal of claim 9, where the lens cover is removeably supported on the mobile terminal.

13. The mobile terminal of claim 9, where the lens cover moves pivotally, laterally, or rotationally with respect to a surface of the mobile terminal.

* * * * *